United States Patent [19]

Kakizawa

[11] Patent Number: 6,111,942
[45] Date of Patent: *Aug. 29, 2000

[54] COMMUNICATION TRANSFER APPARATUS

[75] Inventor: Katsuhiro Kakizawa, Yokohama, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/790,287

[22] Filed: Jan. 28, 1997

[30] Foreign Application Priority Data

Feb. 1, 1996 [JP] Japan ................................ 8-016602

[51] Int. Cl.[7] ................................................ H04M 3/42
[52] U.S. Cl. .......................... 379/211; 379/212; 379/216; 379/355
[58] Field of Search .................... 379/211, 212, 379/207, 219, 220, 221, 229, 230, 142, 201, 373, 216, 355

[56] References Cited

U.S. PATENT DOCUMENTS

| | | | |
|---|---|---|---|
| 5,276,731 | 1/1994 | Arbel et al. ............................... | 379/142 |
| 5,329,578 | 7/1994 | Brennan et al. .......................... | 379/211 |
| 5,369,695 | 11/1994 | Chakravarti et al. .................... | 379/212 |
| 5,392,342 | 2/1995 | Rosenthal ................................. | 379/211 |
| 5,408,528 | 4/1995 | Carlson et al. .......................... | 379/211 |
| 5,430,791 | 7/1995 | Feit et al. ................................. | 379/211 |
| 5,502,763 | 3/1996 | Brendzel ................................... | 379/201 |
| 5,530,931 | 6/1996 | Cook-Hellberg et al. ............... | 379/211 |
| 5,706,339 | 1/1998 | Eisdorfer et al. ........................ | 379/211 |
| 5,724,408 | 3/1998 | Morganstein ............................ | 379/211 |
| 5,724,411 | 3/1998 | Eisdorfer et al. ........................ | 379/211 |
| 5,737,403 | 4/1998 | Zave ......................................... | 379/211 |
| 5,802,160 | 9/1998 | Kugell et al. ............................ | 379/211 |

Primary Examiner—Scott Wolinsky
Attorney, Agent, or Firm—Morgan & Finnegan LLP

[57] ABSTRACT

A transfer apparatus which calls a predetermined transferring destination number when an incoming call on a communication line is detected. The transfer apparatus compares a calling-party number received on an incoming-call received line with the predetermined transferring destination number, and if they do not coincide, the transfer apparatus calls the predetermined transferring destination number; however if they coincide, the transfer apparatus does not perform transferring operation. Accordingly, meaningless transmission such as to transfer an incoming call received from a calling party who is located in the transferring destination can be obviated.

53 Claims, 6 Drawing Sheets

F I G. 4

| | TRANSFERRING DESTINATION ABBREVIATED NUMBER | TRANSFER SETTING |
|---|---|---|
| TELEPHONE LINE A | ABBREVIATED NUMBER 00 | 1 |
| TELEPHONE LINE B | ABBREVIATED NUMBER 00 | 1 |
| TELEPHONE LINE C | ABBREVIATED NUMBER 00 | 1 |
| TELEPHONE LINE D | ABBREVIATED NUMBER 00 | 1 |

1 : TRANSFERRING SET
0 : TRANSFERRING NOT SET

FIG. 5

| ABBREVIATED NUMBER 00 | 030123456 |
|---|---|
| ABBREVIATED NUMBER 01 | 040123456 |
| ABBREVIATED NUMBER 02 | 54321234 |
| ⋮ | ⋮ |
| ABBREVIATED NUMBER 99 | |

FIG. 6

| | |
|---|---|
| 000 | STOP TRANSFER OPERATION OF INCOMING-CALL RECEIVED LINE |
| n∗0 | STOP TRANSFER OPERATION OF LINE n |
| n∗Y | START TRANSFER OPERATION OF LINE n |
| nXY | SET TRANSFER DESTINATION OF LINE n AT ABBREVIATED NUMBER XY |
| ∗XY | SET RECEIVING METHOD OF INCOMING-CALL RECEIVED LINE IN XY METHOD |

COMMUNICATION TRANSFER APPARATUS

BACKGROUND OF THE INVENTION

Present invention relates to a transfer apparatus connected to a switch network for notifying the telephone number of the calling party to a called party.

Conventionally, a transfer apparatus, which performs dialing operation for transferring an incoming call to a predetermined destination, has been suggested.

Alternatively, when an incoming call is received, the call is once answered and a message notifying transferring operation is sent to the received line wire, and the transferring operation can be stopped or a transferring destination can be changed in accordance with a PB signal on the received line wire.

Moreover, by setting the transfer apparatus, it is possible to automatically answer a call received on a line wire and transfer the call by caller dial operation following a guidance message.

However, in the above described conventional example, once the transferring function is activated, it is impossible for a person located in the transferring destination to change the transferring destination or inactivate the transferring function. In addition, since the transfer apparatus always answers an incoming call even when the transferring destination is busy or there is no person to take the call at the destination, the calling party must always be charged for the phone call. Moreover, an additional dialing operation is necessary for each phone call despite the necessity of transferring operation, thus the operation was complicated.

SUMMARY OF THE INVENTION

The present invention has been made in consideration of the above situation, and has as its object to improve transferring performed in response to an incoming call received on a communication line.

Another object of the present invention is to prevent an incoming call received on a communication line from being inappropriately transferred.

Another object of the present invention is to judge that a calling party does not desire transferring, at the time of receiving a call on a communication line without requiring additional operation of the calling party.

Another object of the present invention is to obviate meaningless transmission such as to transfer an incoming call received on a communication line to the calling party who is located in a transferring destination.

Another object of the present invention is to allow a user of the apparatus to change a transferring destination, activate and inactivate a transfer mode via a communication line.

Another object of the present invention is to provide a transfer apparatus and a method thereof which judge whether or not a call is to be transferred, by comparing a telephone number of a calling party received on a communication line and a telephone number of a transferring destination, and a memory medium which stores a program for transferring.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is a transferring data table;

FIG. 5 is an abbreviated dial list; and

FIG. 6 is an instruction list.

DETAILED DESCRIPTION OF THE PREFERRED EMBODIMENT

Preferred embodiment of the present invention will be described in detail in accordance with the accompanying drawings.

Figure 1:
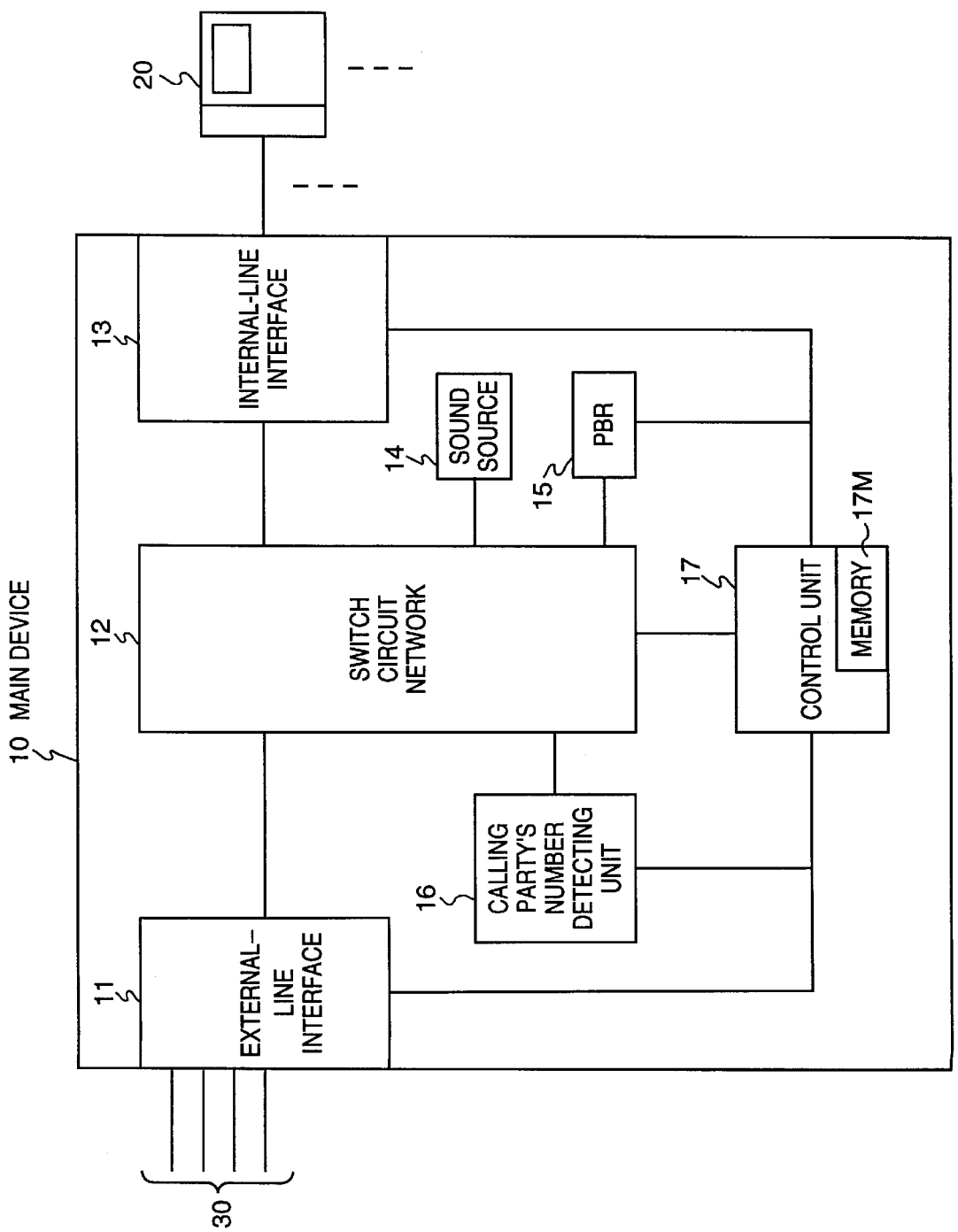
FIG. 1 is a block diagram of a telephone apparatus which adopts the present invention.

Referring to FIG. 1, reference numeral 10 denotes a main device of a telephone apparatus having a transferring function according to the present embodiment; 11, an external-line interface circuit having an interface with a plurality of telephone lines 30; 12, a switch circuit network connecting communication paths; 13, an internal-line interface having an interface with a plurality of extension telephone units 20; 14, a sound source storing various service tones; 15, a PB receiver which detects a PB signal; and 16, a calling party's number detecting unit which detects the telephone number of the calling party sent from the telephone lines 30. Reference numeral 17 denotes a control unit which controls the entire system in accordance with a program stored in a memory 17M. Reference numeral 20 denotes extension telephone units comprising display devices.

Referring to FIG. 1, the extension telephone units 20 are telephone units which enables control operation such as data setting operation or the like, in addition to normal phone call operation. By using a special number or a function button or the like of the extension telephone units 20, activating or inactivating of a transfer function for each of the telephone lines 30, or transferring destinations are set by the control unit 17 via the internal-line interface 13.

In the present embodiment, as shown in FIG. 4, each transferring destination of the telephone lines A, B, C and D is set by an abbreviated dial number of each line. When the transferring function is activated, transfer setting is set to "1", and when the function is stopped, the setting is set to "0". A registering example of the abbreviated dial numbers is shown in FIG. 5. For the abbreviated dial number 00, "030123456" is registered. When an incoming call is received by any of the lines A, B, C and D, an open line is captured and "030123456" is dialed. The registered numbers are stored in the memory 17M of the control unit 17.

Figure 2:
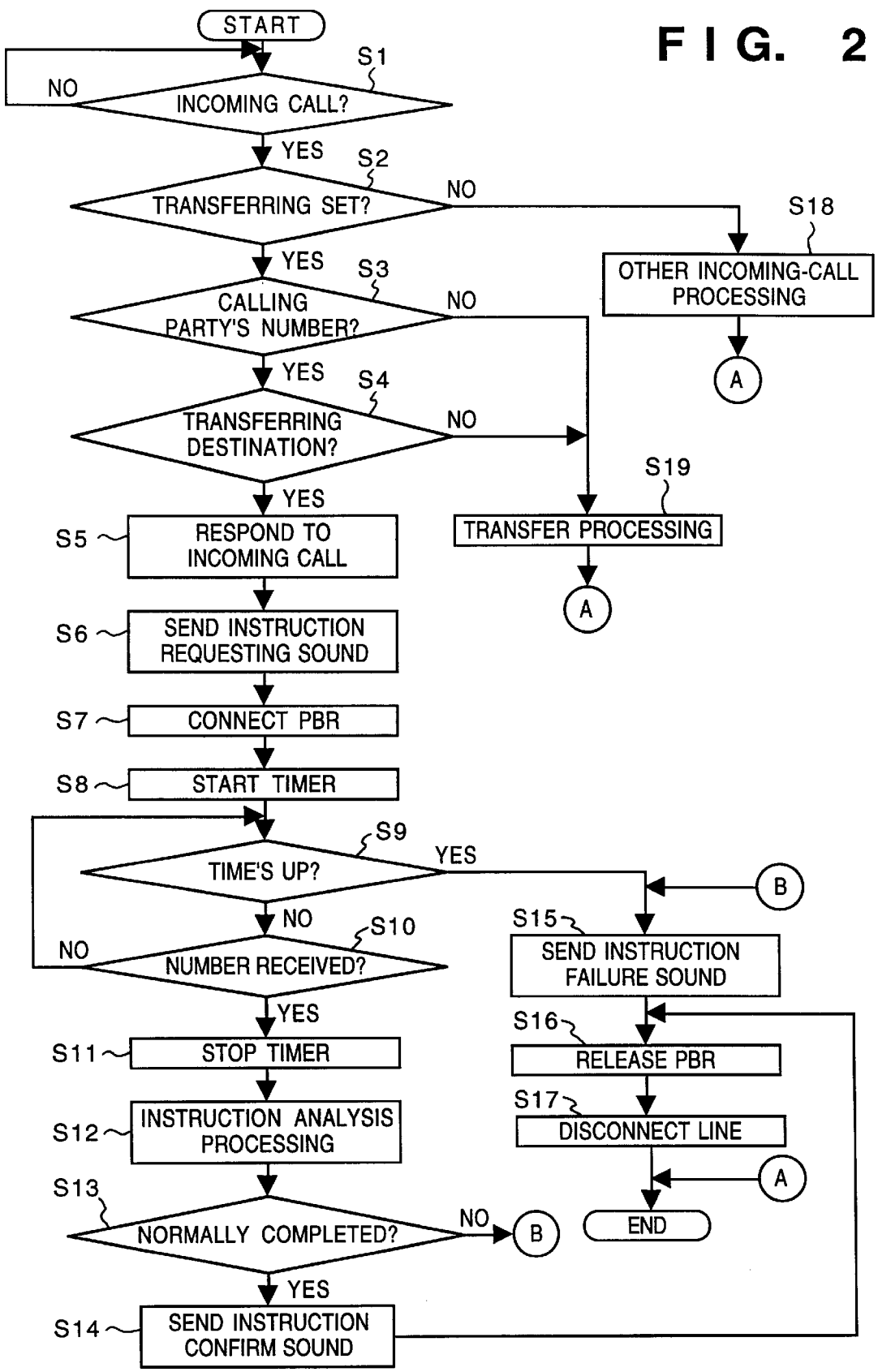
FIG. 2 is a flowchart showing receiving steps of the telephone apparatus which adopts the present embodiment.

Based on the foregoing setting, operation at the time of receiving an incoming call on a line wire will be described with reference to FIG. 2. Note that the flowchart in FIG. 2 describes a part of a program stored in the memory 17M.

When the interface circuit 11 detects an incoming call (YES in step S1), the control unit 17 refers to a setting table shown in FIG. 4 to determine if a transferring mode is set for the incoming-call received line (step S2). If the transferring mode is not set, the processing proceeds to step S18 where other incoming-call processing is performed (e.g., ring one of the extension telephone units 20). If the transferring mode is set, the processing proceeds to step S3 and awaits for the detection result from the calling party's number detection unit 16. If a telephone number of a calling party is not detected, the processing proceeds to step S19 to perform transfer processing (an open line is captured and the content of the abbreviated dial number 00 is dialed). An incoming-call received line and a dialing line are connected after a transferring destination responds to the call, by the controlling operation of the control unit 17 via the switch circuit network 12. When a telephone number of a calling party is detected, the telephone number of the calling party and a telephone number of the transferring destination are compared (step S4). If the numbers do not coincide as a result of comparison, the processing proceeds to step S19.

If the numbers coincide, the interface circuit 11 responds (close the loop) to the incoming-call received line, following an instruction from the control unit 17 (step S5). Then the control unit 17 controls the switch circuit network 12 to connect a communication path between the sound source 15 and interface 11 in order to send a service tone requesting an instruction to the incoming-call received line (step S6). The control unit 17 then controls the switch circuit network 12 to connect a communication path between the interface 11 and the PB receiver 15 to receive an instruction from the incoming-call received line (step S7). To monitor whether or not an instruction is received from the a calling party within a predetermined period of time, a timer is started (step S8). If a number representing a predetermined instruction is not received in the predetermined period of time, the processing proceeds from step S9 to step S15, and the control unit 17 controls the switch circuit network 12 to connect a communication path between the sound source 14 and the interface 11 to send a tone which notifies the incoming-call received line that an instruction cannot be recognized. Then the communication path connection between the incoming-call received line and the PB receiver 15 is released (step S16) and the incoming-call received line is disconnected (step S17). When input reception from the PB receiver 15 is detected in step S10, the monitoring timer is stopped (step S11) and analysis processing of the received instruction is performed (step S12).

The analysis processing of an instruction will be described in detail with reference to the flowchart in FIG. 3. Note that the flowchart in FIG. 3 describes a part of a program stored in the memory 17M.

It is set in advance that the mark * and a two-digit number denote abbreviated dial number setting, and the mark # and a three-digit number denote an instruction shown in FIG. 6.

If the number received in step S21 is * and a two-digit number, the processing proceeds to step S22 where the abbreviated dial list shown in FIG. 5 is checked to determine whether or not the designated abbreviated number has registered data. If no registered data is found in the abbreviated dial list, the processing returns to step S13 to perform processing (steps S15, S16 and S17) for instruction failure.

If registered data is found in the abbreviated dial list, the designated number is set in a transferring destination abbreviated number in the table shown in FIG. 4 (step S23) and the processing proceeds to YES in step S13. The control unit 17 controls the switch circuit network 12 to connect the communication path between the sound source 14 and the interface 11 to send a sound notifying to the incoming-call received line that processing is completed as instructed (step S14). Then the control unit 17 releases the communication path connection between the incoming-call received line and the PB receiver 15 (step S16), resulting in disconnection of the incoming-call received line (step S17), and processing is completed.

If the received number is # and a three-digit number (step S24), whether or not the received number is found in an instruction list shown in FIG. 6 is checked (step S25). If it is not found in the instruction list, the processing returns to step S13 to perform processing (steps S15, S16 and S17) for instruction failure. If it is found in the instruction list, processing according to the instruction is performed (step S26). For instance, if 000 is received, transfer setting of the incoming-call received line shown in the table in FIG. 4 is changed to 0. If 201 is received, the transferring destination abbreviated number corresponding to the line 2 in the table shown in FIG. 4 is set to 01. Then the processing returns to step S13 to perform the above described normal call-completing operation in steps S14, S16 and S17.

If the received number is not # and a three-digit number in step S24, the processing returns to step S13 to perform the aforementioned failure processing in steps S15, S16 and S17.

In addition, a transferring destination is not limited to telephone numbers registered in the abbreviated dial list in FIG. 5, but all figures of a telephone number may be registered.

An instruction is not limited to a PB signal. An instruction may be sent via a control channel if it is via an ISDN circuit. Moreover, the number may have arbitrary figures. A telephone number of a calling party may be received via ISDN. Note that in the case of using ISDN circuit, a service for the ISDN may be requested via an incoming call ISDN circuit, and transfer processing can be realized by utilizing the ISDN service.

Upon responding to an incoming-call received line, for the purpose of security, password input or the like may be requested at the time of executing an instruction.

The instruction request sound, instruction failure sound, instruction confirmation sound may be substituted with voice guidance.

As has been described above, when a telephone number of a transferring destination and the telephone number of a calling party coincide, the transferring destination can be changed from an external location. By virtue of this, a person located in the transferring destination can freely change setting of the transferring function without impairing operability, thus facility of the transferring function can be improved.

Figure 3:
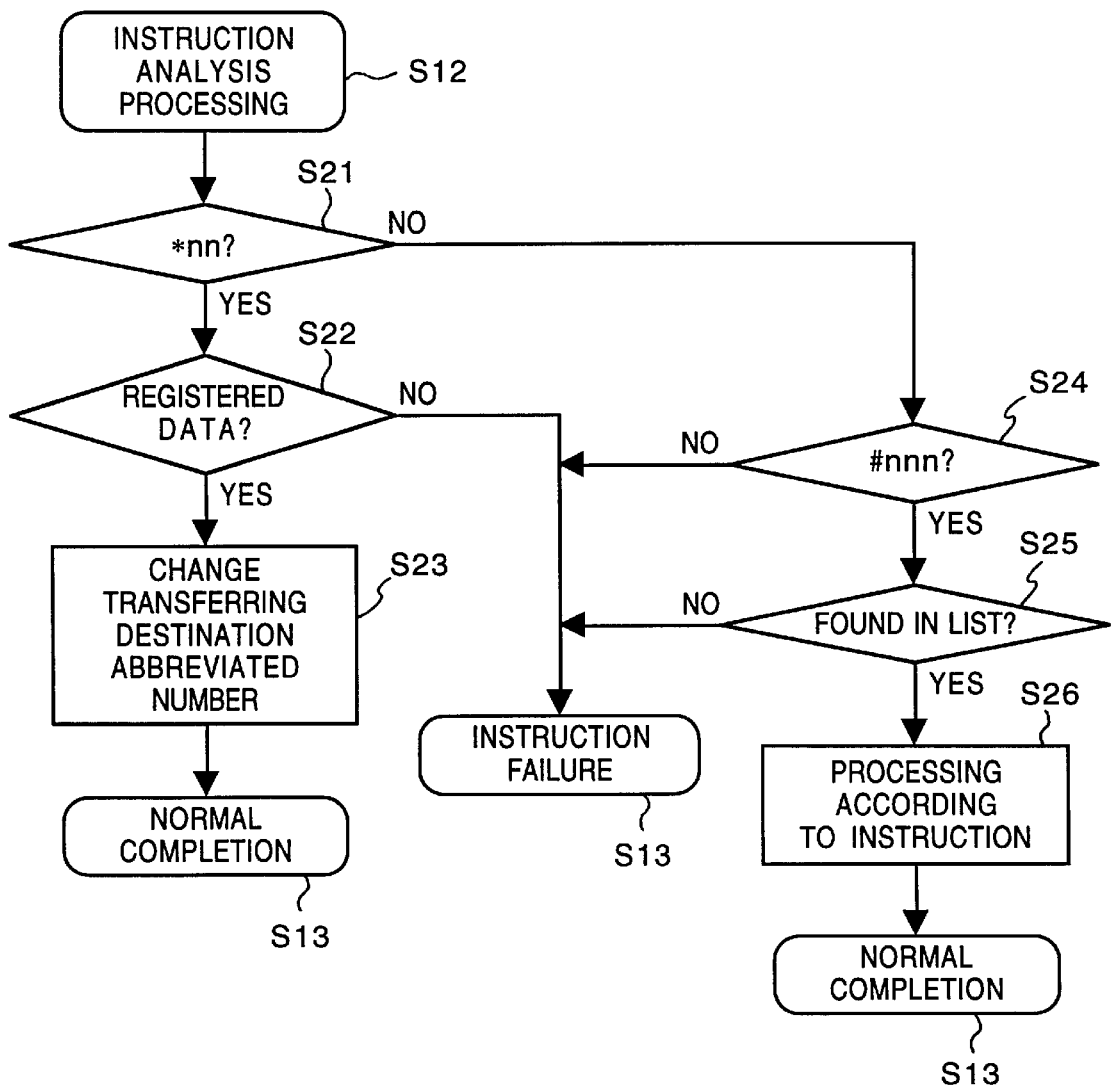
FIG. 3 is a flowchart showing analyzing processing of an instruction to change a transfer mode of the telephone apparatus which adopts the present invention.

Note that if the number received in step S25 in FIG. 3 is *01, the incoming-call receiving method is set in a voice message. In the case where the incoming-call receiving method is set in a voice message, in step S18 in FIG. 2, the control unit 17 activates a voice message device (not shown) connected to the switch circuit network 12 in parallel with the sound source 14. The control unit 17 then controls the switch circuit network 12 to connect the incoming-call received line and the voice message device, and sends the voice message from the voice message device to a calling party via the incoming-call received line. As described above, according to the present embodiment, in addition to activating or inactivating a transferring mode and changing a transferring destination, it is possible to set an incoming-call receiving mode other than transferring mode.

Furthermore, a program stored in the control unit 17 may be stored in the memory 17M in advance, or may be read from a disk (not shown) to the memory 17M when the power is turned on. Moreover, the program in the control unit 17 may be written from an external computer (not shown), which is connected to the internal-line interface 13, into the memory 17M.

The present invention is not limited to the above embodiments and various changes and modifications can be made within the spirit and scope of the present invention. Therefore, to appraise the public of the scope of the present invention, the following claims are made.

What is claimed is:

1. A transfer apparatus for calling a transferring destination number when an incoming call is received from a communication line, comprising:
    detection means for detecting a calling-party number from the communication line;
    comparing means for comparing the transferring destination number and the calling-party number;
    calling means for calling the transferring destination number, when the comparing means determines that the calling-party number and the transferring destination number do not coincide; and
    reception means for receiving an instruction from the communication line, when the comparing means determines that the calling-party number and the transferring destination number coincide.

2. The transfer apparatus according to claim 1, wherein when the calling-party number and the transferring destination number coincide, calling operation to the transferring destination number is not performed.

3. The transfer apparatus according to claim 1, further comprising instruction request means for requesting the instruction from the communication line, when the calling-party number and the transferring destination number coincide.

4. The transfer apparatus according to claim 1, wherein the communication line from which the incoming call is received and a calling line via which calling operation to the transferring destination number is performed are connected after the transferring destination responds to a call.

5. The transfer apparatus according to claim 1, further comprising change means for changing the transferring destination number in accordance with the instruction received by said reception means.

6. The transfer apparatus according to claim 1, further comprising reset means for resetting a transfer mode in accordance with the instruction received by said reception means.

7. A transfer method comprising the steps of:
    detecting a calling-party number from a communication line;
    calling a transferring destination number when it is determined that the calling-party number and the transferring destination number do not coincide; and
    receiving an instruction from the communication line when it is determined that the calling-party number and the transferring destination number coincide.

8. The transfer method according to claim 7, further comprising the step of changing the transferring destination number in accordance with the instruction from the communication line.

9. The transfer method according to claim 7, further comprising the step of:
    in a case where a transfer mode is not set, generating a ringing sound in accordance with an incoming call; and
    in a case where the transfer mode is set, when the calling-party number received from the communication line coincides with the transferring destination number, resetting the transfer mode in accordance with the instruction from the communication line.

10. The transfer method according to claim 7, further comprising the step of connecting the communication line from which an incoming call is received and a calling line via which the transferring destination number is called after the transferring destination responds to a call.

11. The transfer method according to claim 7, wherein the transferring destination number is not called when the calling-party number and the transferring destination number coincide.

12. The transfer method according to claim 7, wherein said receiving step comprises a step of requesting the instruction to the communication line.

13. A memory medium storing a program for transferring an incoming call from a communication line to a transferring destination number, comprising:
    a first code of a step of detecting a calling-party number from the communication line;
    a second code of a step of calling the transferring destination number when it is determined that the calling-party number and the transferring destination number do not coincide; and
    a third code of a step of receiving an instruction from the communication line when it is determined the calling-party number and the transferring destination number coincide.

14. The memory medium according to claim 13, wherein said third code further comprises the step of changing the transferring destination number in accordance with the instruction from the communication line.

15. The memory medium according to claim 13, wherein said third code further comprises the step of resetting a transfer mode in accordance with the instruction from the communication line.

16. The memory medium according to claim 13, wherein said second code further comprises the step of connecting the communicating line from which the incoming call is received and a calling line via which the transferring destination number is called after the transferring destination responds to a call.

17. The memory medium according to claim 13, wherein the transferring destination number is not called when the calling-party number and the transferring destination number coincide.

18. The memory medium according to claim 13, further comprising a fourth code of a step of requesting the instruction to the communication line.

19. A transfer apparatus for calling a transferring destination number when an incoming call is received from a communication line, comprising:
    detection means for detecting a calling-party number from the communication line;
    comparing means for comparing the transferring destination number and the calling-party number;
    calling means for calling the transferring destination number, when the comparing means determines that the calling-party number and the transferring destination number do not coincide; and
    sending means for sending a signal for requesting an instruction to the communication line, when the comparing means determines that the calling-party number and the transferring destination number coincide.

20. The transfer apparatus according to claim 19, further comprising reception means for receiving the instruction from the communication line, when the calling-party number and the transferring destination number coincide.

21. The transfer apparatus according to claim 20, further comprising change means for changing the transferring destination number in accordance with the instruction received by said reception means.

22. The transfer apparatus according to claim 20, further comprising reset means for resetting transfer mode in accordance with the instruction received by said reception means.

23. The transfer apparatus according to claim 19, wherein when the calling-party number and the transferring destination number coincide, calling operation to the transferring destination number is not performed.

24. The transfer apparatus according to claim 19, wherein the communication line from which the incoming call is received and a calling line via which calling operation to the transferring destination number is performed are connected after the transferring destination responds to a call.

25. A transfer method comprising the steps of:
   detecting a calling-party number from a communication line; and
   calling a transferring destination number when it is determined that the calling-party number and the transferring destination number do not coincide; and
   sending a signal for requesting an instruction to the communication line when it is determined that the calling-party number and the transferring destination number coincide.

26. The transfer method according to claim 25, further comprising the step of changing the transferring destination number in accordance with the instruction from the communication line.

27. The transfer method according to claim 25, further comprising the step of:
   in a case where a transfer mode is not set, generating a ringing sound in accordance with an incoming call; and
   in a case where the transfer mode is set, when the calling-party number received from the communication line coincides with the transferring destination number, resetting the transfer mode in accordance with the instruction from the communication line.

28. The transfer method according to claim 25, further comprising the step of connecting the communication line from which an incoming call is received and a calling line via which the transferring destination number is called after the transferring destination responds to a call.

29. The transfer method according to claim 25, wherein the transferring destination number is not called when the calling-party number and the transferring destination number coincide.

30. A memory medium storing a program for transferring an incoming call from a communication line to a transferring destination number, comprising:
   a first code of a step of detecting a calling-party number received from the communication line;
   a second code of a step of calling the transferring destination number when it is determined that the calling-party number and the transferring destination number do not coincide; and
   a third code of a step of sending a signal for requesting an instruction to the communication line when it is determined that the calling-party number and the transferring destination number coincide.

31. The memory medium according to claim 30, wherein said third code further comprises the step of changing the transferring destination number in accordance with the instruction from the communication line.

32. The memory medium according to claim 30, wherein said third code further comprises the step of resetting the transfer mode in accordance with the instruction from the communication line.

33. The memory medium according to claim 30, wherein said second code further comprises the step of connecting the communication line from which the incoming call is received and a calling line via which the transferring destination number is called after the transferring destination responds to a call.

34. The memory medium according to claim 30, wherein the transferring destination number is not called when the calling-party number and the transferring destination number coincide.

35. A transfer apparatus for calling one of a plurality of transferring destination numbers when an incoming call is received from a communication line, comprising:
   memory means for storing the plurality of transferring destination numbers, each of which corresponds to an abbreviated number;
   selecting means for selecting one of the plurality of transferring destination numbers in accordance with a corresponding abbreviated number;
   detection means for detecting a calling-party number from the communication line; and
   response means for responding to the incoming call when it is determined that the calling-party number and the transferring destination number coincide.

36. The transfer apparatus according to claim 35, further comprising reception means for receiving an instruction from the communication line, when said response means responds to the incoming call.

37. The transfer apparatus according to claim 35, wherein when the calling-party number and the transferring destination number coincide, calling operation to the transferring destination number is not performed.

38. The transfer apparatus according to claim 35, further comprising instruction request means for requesting an instruction to the communication line, when said response means responds to the incoming call.

39. The transfer apparatus according to claim 35, wherein the communication line from which the incoming call is received and a calling line via which the transferring destination number is called are connected after the transferring destination responds to a call.

40. The transfer apparatus according to claim 35, further comprising change means for changing the transferring destination number in accordance with an instruction from the communication line when said response means responds to the incoming call.

41. The transfer apparatus according to claim 35, further comprising resetting means for resetting transfer mode in accordance with an instruction from the communication line when said response means responds to the incoming call.

42. A transfer method for a transfer apparatus comprising a memory in which a plurality of transferring destination numbers are stored, each of the transferring destination numbers corresponding to an abbreviated number, the method comprising the steps of:
   selecting one of the plurality of transferring destination numbers in accordance with a corresponding abbreviated number;
   detecting a calling-party number of an incoming call received from a communication line;
   calling the one of the transferring destination numbers selected in said selecting step when it is determined that the calling-party number and the transferring destination number do not coincide; and
   responding to the incoming call when it is determined that the calling-party number and the transferring destination number coincide.

43. The transfer method according to claim 42, further comprising the step of changing the transferring destination number in accordance with an instruction from a calling party.

44. The transfer method according to claim 42, further comprising the step of:

in a case where a transfer mode is not set, generating a ringing sound in accordance with the incoming call; and in a case where the transfer mode is set, when the calling-party number received from the communication line coincides with the transferring destination number, resetting the transfer mode in accordance with the instruction from the calling party.

45. The transfer method according to claim 42, further comprising the step of connecting the communication line from which an incoming call is received and a calling line via which the transferring destination number is called after the transferring destination responds to a call.

46. The transfer method according to claim 42, wherein the transferring destination number is not called when the calling-party number and the transferring destination number coincide.

47. The transfer method according to claim 42, wherein said responding step comprises a step of requesting the instruction to the calling party.

48. A memory medium storing a program for a transfer apparatus for transferring an incoming call from a communication line to one of a plurality of transfer destination numbers, the transfer apparatus comprising a memory in which the plurality of transferring destination numbers are stored, each of the transferring destination numbers corresponding to an abbreviated number, the program comprising:

a first code of a step of detecting a calling-party number received from the communication line;

a second code of a step of calling one of the plurality of transferring destination numbers when it is determined that the calling-party number and the transferring destination number do not coincide;

a third code of a step of responding to the incoming call when it is determined that the calling-party number and the transferring destination number coincide; and a fourth code of a step of selecting one of the plurality of transferring destination numbers in accordance with a corresponding abbreviated number.

49. The memory medium according to claim 48, wherein said third code further comprises the step of changing the transferring destination number in accordance with an instruction from a calling party.

50. The memory medium according to claim 48, wherein said third code further comprises the step of resetting a transfer mode.

51. The memory medium according to claim 48, wherein said second code further comprises the step of connecting the communication line from which the incoming call is received and a calling line via which the transferring destination number is called after the transferring destination responds to a call.

52. The memory medium according to claim 48, wherein the transferring destination number is not called when the calling-party number and the transferring destination number coincide.

53. The memory medium according to claim 48, further comprising a fifth code of a step of requesting an instruction from a calling party.

* * * * *

UNITED STATES PATENT AND TRADEMARK OFFICE
CERTIFICATE OF CORRECTION

| | |
|---|---|
| PATENT NO. | : 6,111,942 |
| DATED | : August 29, 2000 |
| INVENTOR(S) | : Katsuhiro Kakizawa |

It is certified that error appears in the above-identified patent and that said Letters Patent is hereby corrected as shown below:

<u>Titlel page,</u>
Item [56], References Cited, U.S. PATENT DOCUMENTS, insert the following references:

| | | |
|---|---|---|
| 5,267,307 | 11/1993 | Izumi et al. |
| 5,408,527 | 04/1995 | Tsutsui |
| 5,436,962 | 07/1995 | Hirata |
| 5,586,172 | 12/1996 | Sakurai et al. |

<u>Column 3,</u>
Line 24, "from the a calling" should read -- from the calling --.

<u>Column 6, claim 13,</u>
Line 21, "determined the" should read -- determined that the --.

Signed and Sealed this

Fifth Day of February, 2002

Attest:

JAMES E. ROGAN
*Attesting Officer*   *Director of the United States Patent and Trademark Office*